US006772392B1

(12) United States Patent
Kawada et al.

(10) Patent No.: US 6,772,392 B1
(45) Date of Patent: Aug. 3, 2004

(54) IMAGE FAILURE DETECTION UNIT IN REDUNDANT DUPLEX TRANSMISSION

(75) Inventors: Ryoichi Kawada, Tokyo (JP); Shuichi Matsumoto, Tokyo (JP)

(73) Assignee: KDD Corporation, Tokyo (JP)

( * ) Notice: Subject to any disclaimer, the term of this patent is extended or adjusted under 35 U.S.C. 154(b) by 817 days.

(21) Appl. No.: 09/585,321

(22) Filed: Jun. 2, 2000

(30) Foreign Application Priority Data

Jun. 3, 1999 (JP) ............................................. 11-156432

(51) Int. Cl.⁷ ........................... G06F 7/02; H03M 13/00
(52) U.S. Cl. ................. 714/820; 382/195; 375/240.08; 375/240.09; 348/192; 714/797; 386/111
(58) Field of Search .................... 714/4, 797, 819–821; 348/192; 725/116; 324/158.1; 382/195, 206, 236, 111, 302, 84; 345/756; 386/111; 370/225, 228, 297; 709/239

(56) References Cited

U.S. PATENT DOCUMENTS

| | | | | |
|---|---|---|---|---|
| 3,048,840 | A | | 8/1962 | Ferrar et al. ................. 343/100 |
| 4,242,756 | A | | 12/1980 | Huffman et al. ................ 455/8 |
| 4,306,313 | A | | 12/1981 | Baldwin ....................... 455/601 |
| 4,616,256 | A | | 10/1986 | Boutmy ........................ 358/86 |
| 5,122,873 | A | * | 6/1992 | Golin ....................... 375/240.23 |
| 5,274,446 | A | * | 12/1993 | Ashida ........................ 348/192 |
| 5,446,492 | A | | 8/1995 | Wolf et al. .................. 348/192 |
| 6,038,371 | A | * | 3/2000 | Shimoda et al. ............. 386/111 |
| 6,157,745 | A | * | 12/2000 | Salembier .................... 382/236 |
| 6,272,245 | B1 | * | 8/2001 | Lin ............................. 382/195 |
| 6,546,054 | B1 | * | 4/2003 | Kawada et al. ........ 375/240.29 |
| 6,603,505 | B1 | * | 8/2003 | Kawada et al. ............. 348/192 |

FOREIGN PATENT DOCUMENTS

| WO | WO97/24822 | 7/1997 |
|---|---|---|
| WO | WO98/54923 | 12/1998 |
| WO | WO99/05802 | 2/1999 |

OTHER PUBLICATIONS

Harry Newton, Newton's Telecom Dictionary, Feb. 2002, CMP Books, 18th Edition, pp. 381 and 391.*
European Search Report dated Apr. 3, 2002.

\* cited by examiner

*Primary Examiner*—Guy J. Lamarre
(74) *Attorney, Agent, or Firm*—Westerman, Hattori, Daniels & Adrian, LLP

(57) ABSTRACT

There is provided an image failure detection unit in redundant duplex transmission in which a failure occurring on a regular link is detected at in real time, and the link is instantaneously switched to a normal backup link, thereby preventing any failure from occurring on an output image or reducing the failure. Units for calculation of the image features calculate image features of links A and B, respectively. A comparison unit compares the image features, and then, it is judged that both of the links are normal if there is not difference between the image features. To the contrary, if there is a difference, it is judged that there is a probability of occurrence of a failure on one of the links. Thereafter, a normal/corrupted information memory stores a small region relating to the image features. Units for detection of image feature differences determine image feature differences for the links, respectively.

12 Claims, 4 Drawing Sheets

(NORMAL/CORRUPTED
INFORMATION OF LINK A)

(NORMAL/CORRUPTED
INFORMATION OF LINK B)

$$D_{Ai} = \sum_{b_j \in C} |f_{Ai}(g_1(b_j)) - f_{Ai}(g_2(b_j))| \quad \cdots (3)$$

WHEREIN C REPRESENTS THE ENTIRE BOUNDARY BETWEEN NORMAL AND CORRUPTED REGIONS $$\|D\| = \max_{1 \leq i \leq N} \{\omega_i D_i\} \quad \cdots (4)$$

$$D_{Ai} = \left| \frac{1}{n_0} \sum_{p \in O} f_{Ai}(p) - \frac{1}{n_x} \sum_{p \in x} f_{Ai}(p) \right| \quad \cdots (6)$$

IMAGE FAILURE DETECTION UNIT IN REDUNDANT DUPLEX TRANSMISSION

BACKGROUND OF THE INVENTION

1. Field of the Invention

The present invention relates to an image failure detection unit in redundant duplex transmission and, more particularly, to an image failure detection unit in redundant duplex transmission in which a failure occurring in a regular link can be automatically detected in an instant so that the regular link can be switched to a backup link without causing any failure in an output image in the redundant duplex transmission in which the same image is transmitted via two links.

2. Description of the Related Art

There has been conventionally used a system in which the same image is transmitted via two links, and then, a normal link is selected on an output side so as to secure high reliability of image transmission. One example of such a system is illustrated in FIG. 8.

In FIG. 8, an encoder 51, a transmission line and a decoder 53 constitute a first link; and another encoder 55, another transmission line and another decoder 57 constitute a second link. A failure detection unit 54 detects a failure which may occur on the first link; and another failure detection unit 58 detects a failure which may occur on the second link. A switcher 59 selectively connects the first or second link to an output line.

The failure detection unit 54 or 58 detects a failure based on the fact that a synchronizing signal is lost from a video signal to be transmitted or the fact that a transmission error rate exceeds a predetermined value. If such a failure continues for a predetermined period of time, the failure detection unit 54 or 58 judges that a failure occurs on the transmission link, so as to start an alarm, not shown. Thereafter, the switcher 59 is manually or automatically switched to the second link in accordance with the alarm, and consequently, the second link is connected to the output line.

However, in the above-described prior art, it has taken several seconds or longer until the failure detection unit 54 or 58 detects the transmission failure to switch the switcher 59 to the other transmission link. Therefore, there has arisen a problem that the video picture with the failure is unavoidably output for the several seconds or longer.

SUMMARY OF THE INVENTION

An object of the present invention is to provide an image failure detection unit in redundant duplex transmission, in which if a failure occurs on a regular link, the failure can be detected in real time so that the regular link is instantaneously switched to a normal backup link, thus preventing outputting of an image with the failure or reducing outputting of an image with the failure.

In order to achieve the above-described object, the present invention provides an image failure detection unit in redundant duplex transmission, in which the same image is transmitted via a plurality of links and the image transmitted via a normal link is selectively used as an output image, the image failure detection unit comprising: means for determining image features per small region inside each of the images transmitted via the plurality of links; and means for comparing differences, between the links, in image feature per small region inside each of the images determined by the determining means; wherein when there is no difference in image feature per small region between the links, it is judged that the link is normal; to the contrary, when there is a difference, it is judged that a failure occurs on either of the links.

Furthermore, the present invention provides an image failure detection unit in redundant duplex transmission further comprising: means for storing the small region as a normal region in the case where there is no difference, between the links, in image feature per small region inside each of the images, while for storing the small region as a corrupted region in the case where there is a difference; and means for determining a difference in image feature between the normal region and the corrupted region; wherein it is judged that a failure occurs on the link having a greater difference.

Moreover, the present invention provides an image failure detection unit in redundant duplex transmission further comprising: means for judging whether or not the difference in image feature between the normal region and the corrupted region is a predetermined value or greater, so as to regard the failure to be significant if the difference is the predetermined value or greater; to the contrary, so as to regard the failure to be insignificant if the difference is smaller than the predetermined value; and means for deciding the disrupted link based on the majority decision of the failure judged to be significant.

According to the present invention, since the occurrence of the failure on the link can be detected by the use of the image transmitted via the plurality of links, the failure on the link can be detected in real time. Furthermore, according to the present invention, the image feature difference between the normal region and the corrupted region is determined, and consequently, it is judged that the failure occurs on the link having the greater difference, thus enhancing the accuracy of the judgment as to which link the failure occurs on. Moreover, according to the present invention, since the link on which the failure occurs is determined based on the majority of the failure judgment based on the significant difference, it is possible to further improve the accuracy of the judgment of the link on which the failure occurs and stably switch the link, thus enhancing the reliability of the detection unit.

DETAILED DESCRIPTION OF THE PREFERRED EMBODIMENT

Figure 1:
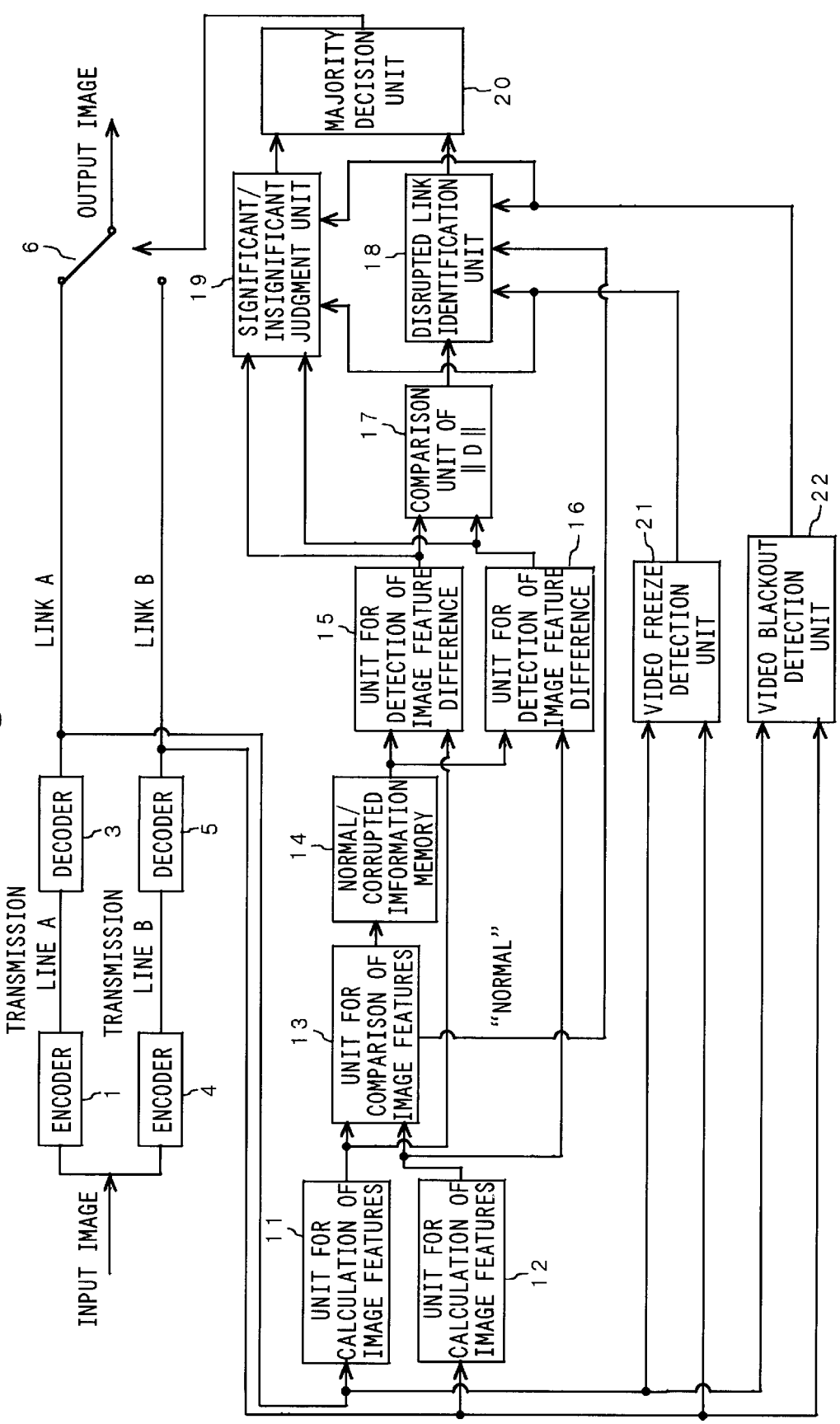
FIG. 1 is a block diagram illustrating the schematic configuration of an image failure detection unit in redundant duplex transmission in a preferred embodiment according to the present invention.

A preferred embodiment of the present invention will now be described in reference to the drawings. FIG. 1 is a block diagram illustrating the schematic configuration of an image failure detection unit in a preferred embodiment according to the present invention.

In duplex image transmission consisting of a regular link (hereinafter, referred to as "a link A") and a backup link (hereinafter, referred to as "a link B"), an input image is distributed to the two links by a distributor, and then, the distributed images are coded in encoders 1 and 4, respectively. The coded images are transmitted to decoders 3 and 5 via transmission lines A and B over, for example, an ATM network, respectively, and thereafter, they are decoded. The decoded image is selected by a switcher 6, to be output as an output image.

In the case where the encoders 1 and 4 are inserted to the two links A and B, respectively, coding noises are generally different from each other on the two links. Therefore, when a failure is to be detected by simply comparing signals via the two links, the difference in coding noise adversely affects the result of failure detection. In view of this, the present inventor has paid attention to not use detection of a failure based on the simple difference in the two signals but use of the whole image feature difference which is less influenced by noise or the like in order to accurately detect degradation of a quality of an image peculiar to a transmission error, that is, a block-like corrupted portion locally present inside a frame, and therefore, has taken the magnitude of the image feature difference between the two links A and B as a criterion of the failure detection.

A unit 11 for calculation of image features calculates image features of an image on the link A; and another unit 12 for calculation of image features calculates image features of an image on the link B. The unit 11 or 12 for calculation of image features extracts a block of, for example, 16×16 pixels from the image on the link A or B, and then, calculates an image feature $\{f_{Ai}(P)\}$ or $\{f_{Bi}(P)\}$ inside the block on the link A or B. Here, i represents kinds of features: for example, the average (i=1), the variance (i=2), etc. can be used, wherein i is 1, 2, ..., N. The image feature inside the block may be others than the average and the variance. Moreover, P represents the position of the block inside the frame.

As well known, the average is expressed by the equation (1) below, and the variance is expressed by the equation (2) below:

Average=$f_{A1}(P)$=$f_{B1}(P)$=$1/n \cdot \Sigma I(p)$ (1)

variance=$f_{A2}(P)$=$f_{B2}(P)$=$1/n \cdot \Sigma \{I(p)\}^2 - \{Average\}^2$ (2)

Here, p represents the position of a pixel inside the block; I(p), a pixel value; and n, the number of pixels inside the block.

Subsequently, a unit 13 for comparison of image features judges whether or not the inequality expressed below is established with respect to a threshold value $Th_i$ set for each kind i of the feature:

$|f_{Ai}(P)-f_{Bi}(P)|>Th_i$

If the above-expressed inequality is established with respect to any one of the kinds i, it is judged that a failure occurs on either of the links A and B. Thereafter, the judgment result is stored per block in a normal/corrupted information memory 14. To the contrary, if the above-expressed inequality is not established with respect to either of the kinds i or the positions P, it is judged that the links are normal, and then, a judgment signal of the normality is sent to a disrupted link identification unit 18.

Figure 2A:
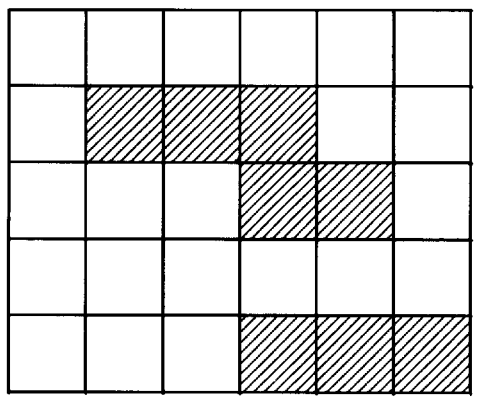
FIGS. 2A and 2B are conceptual views illustrating normal/corrupted information.
Figure 2B:
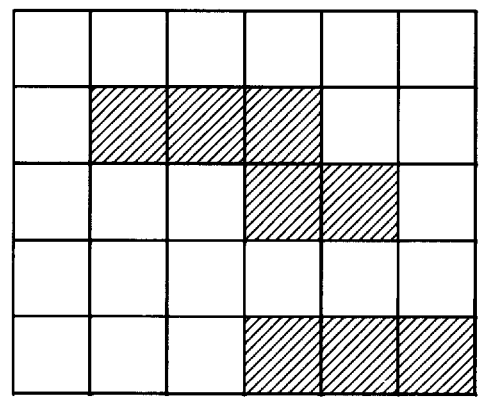
Figure 2B:
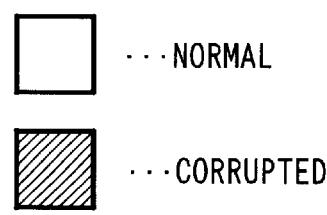

FIGS. 2A and 2B conceptually illustrate normal/corrupted information of each of the links A and B stored in the normal/corrupted information memory 14. A shaded block represents a corrupted region; and a blank block represents a normal region. Since the respective pieces of normal/corrupted information of the links A and B become the same as each other, only the normal/corrupted information of, for example, the link A may be stored in the normal/corrupted information memory 14.

Figure 3:
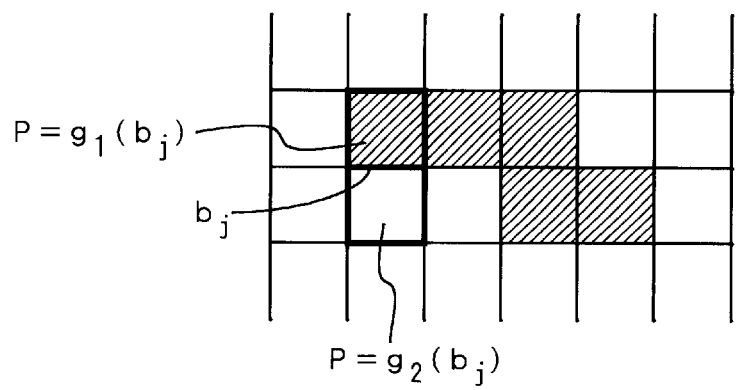
FIG. 3 is a view illustrating a method for determining an image feature difference.

Next, units 15 and 16 for detection of an image feature difference determine a difference D={Di} (i=1, 2, ..., N) of the image features between the normal region and the corrupted region with respect to the frames of each of the links A and B illustrated in FIGS. 2A and 2B. Specifically, for example, as illustrated in FIG. 3, a sum of absolute differences of portions along the boundary between the normal and corrupted regions is calculated with respect to each of the features. That is, an intra-link difference $D_{Ai}$ of an i-th feature on the link A is expressed by the equation (3) in FIG. 4, wherein bj (j=1, 2, ..., 2N) represents the boundary (one side of the block) between the blocks inside the frame and $g_1(b_j)$ and $g_2(b_j)$ represent the positions of the two blocks holding the boundary $b_j$ therebetween. An intra-link difference $D_{Bi}$ of an i-th feature on the link B can be determined in the same manner. With this processing, the i-th feature differences $D_{Ai}$ and $D_{Bi}$ per frame can be determined.

Figures 4, 5:
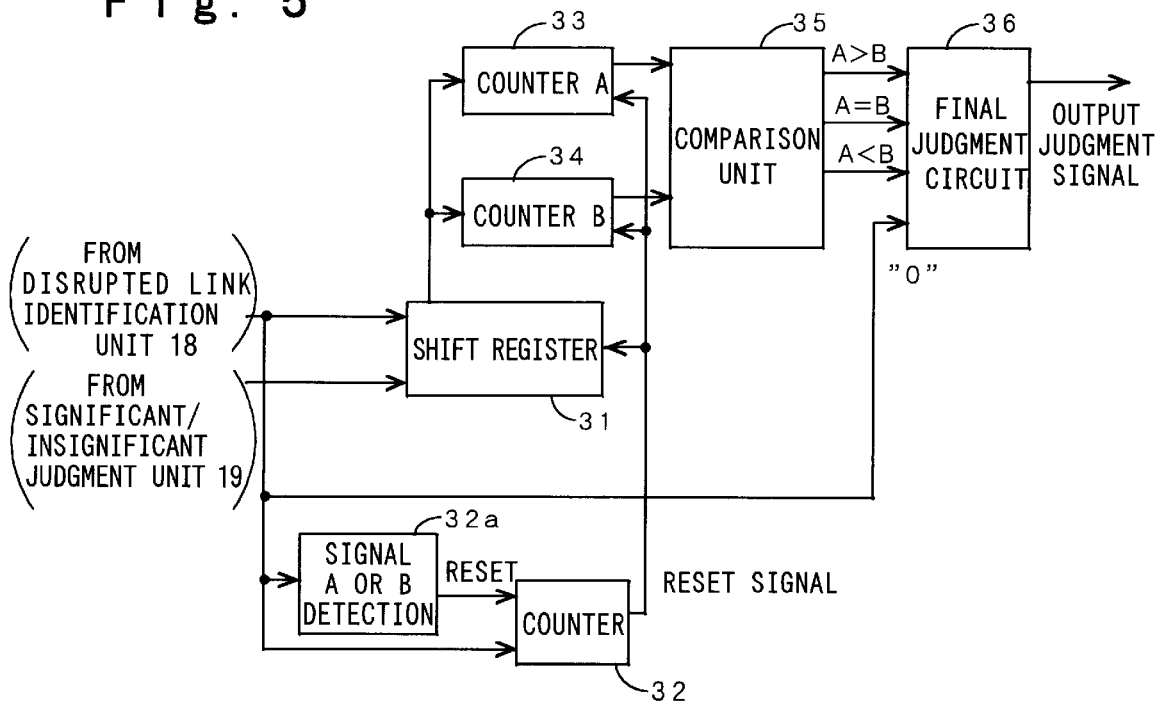
FIG. 4 shows mathematical equations.
FIG. 5 is a block diagram illustrating one specific example of a majority unit.

Subsequently, a comparison unit 17 determines $\|D\|$ of each of the links A and B defined by the equation (4) in FIG. 4, and then, compares the magnitudes of $\|D\|$ of both of the links A and B. The disrupted link identification unit 18 judges the link having the greater $\|D\|$ as a disrupted link. Here, in the equation (4), $\omega_i$(i=1, 2, ..., N) represents the weight per image feature i, which may be determined as follows: namely, a preliminary experiment is conducted on an image without any failure (a test image); the distribution of differences between adjacent blocks is determined per feature i; and finally, the inverse of the standard deviation of the distribution can be taken as the weight $\omega_i$ with respect to the feature i.

In the meanwhile, a significant/insignificant judgment unit 19 performs calculation in accordance with the inequality (5) expressed below, so as to judge whether the failure judgment judged by the disrupted link identification unit 18 is significant or insignificant.

$(\|DA\|-\|DB\|)/(\|DA\|+\|DB\|)>TH$ (5)

When the inequality (5) is established, the failure judgment judged by the disrupted link identification unit 18 is significant. To the contrary, when the inequality (5) is not established, the failure judgment is insignificant. In other words, when the intra-link feature difference between the links A and B is small, a judgment signal is low in reliability, to be assumed insignificant.

A signal indicating the disrupted link determined by the disrupted link identification unit 18 and a signal indicating the significance/insignificance determined by the significant/insignificant judgment unit 19 are sent to a majority decision unit 20. The disrupted link identification unit 18 outputs a signal relating to the disrupted link, for example, a signal A in the case where it is judged that the link A is the disrupted link, or a signal B in the case where it is judged that the link B is the disrupted link. Furthermore, the disrupted link identification unit 18 outputs a normal signal (hereinafter referred to as "a signal 0") to the majority decision unit 20 when it receives a signal indicative of normality of both of the links A and B from the unit 13.

Otherwise, the significant/insignificant judgment unit 19 judges the significance when occurrence of video freeze or video blackout is detected by a video freeze detection unit 21 or a video blackout detection unit 22, later described. The disrupted link identification unit 18 outputs to the majority decision unit 20 a signal indicative of the link, in which the video freeze or video blackout occurs, as a disrupted link.

Next, the majority decision unit 20 decides majority in order to enhance the reliability of the disrupted link judgment. Furthermore, the majority decision unit 20 prevents any contribution of the disrupted link judgment of the insignificance in the disrupted link identification unit 18 to the majority decision in accordance with the judgment result of the significant/insignificant judgment unit 19 in order to enhance the effectiveness of the majority decision. Namely, the majority decision unit 20 subjects only a significant disrupted link judgment signal to the majority decision.

The configuration of one specific example of the majority decision unit 20 will be explained below in reference to FIG. 5. The majority decision unit 20 comprises: a shift register 31 (e.g., 29 bits) for loading (and shifting) the disrupted link judgment signal input from the disrupted link identification unit 18 in response to a signal indicating the significance sent from the significant/insignificant judgment unit 19; a counter 32 for counting signals 0 out of the disrupted link judgment signals, so as to output a resetting signal if it continuously counts, for example, 600 signals 0; counters A 33 and B 34 for counting the number of signals A and signals B which are latched in the shift register 31; a comparison unit 35 for comparing the counts counted by the counters A 33 and B 34; and a final judgment circuit 36 which receives signals from the comparison unit 35 and the signals 0 out of the disrupted link judgment signals. The counter 32 is reset when the signal A or B is detected by a signal A or B detection unit 32a.

The final judgment circuit 36 outputs, as an output judgment signal, the signal B if the output from the comparison unit 35 is A>B, the signal A if A<B, and the signal 0 if A=B. In the case where the judgment signal 0 is input, the final judgment circuit 36 preferentially outputs the signal 0 as the output judgment signal. The switcher 6 selects the link B when the signal B is output from the final judgment circuit 36; to the contrary, it selects the link A when the signal A is output. Or, when the signal 0 is output, the currently connected state is maintained.

In the above-described circuit, in the case where the block inside the frame is corrupted due to the failure occurring on the transmission line and the corrupted block is locally present inside the frame, it is possible to effectively judge whether the failure occurs on the link A or on the link B. However, the above-described circuit cannot effectively detect a failure of a video picture frozen over a plurality of fields, i.e., so-called video freeze, or a failure of video blackout of an abrupt change of a video picture to a black or white level. In view of this, in the present embodiment, as illustrated in FIG. 1, the video freeze detection unit 21 and the video blackout detection unit 22 are additionally provided in parallel in the above-described circuit.

Figure 6:
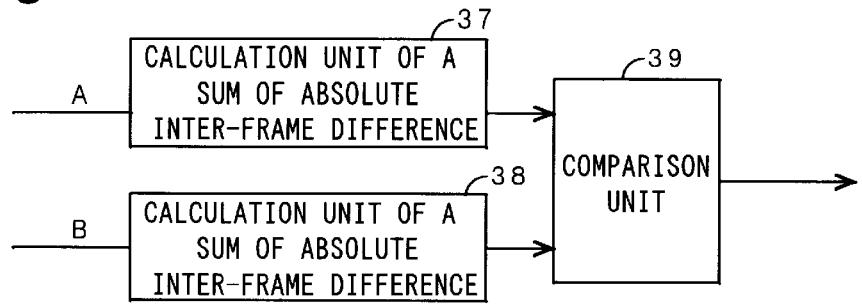
FIG. 6 is a block diagram illustrating one specific example of a video freeze detection unit.

Subsequently, explanation will be made on the configuration and function of the video freeze detection unit 21 in reference to FIG. 6. The video freeze detection unit 21 includes a unit 37 for calculation of a sum of absolute inter-frame differences on the link A, a unit 38 for calculation of a sum of absolute inter-frame differences on the link B and a comparison unit 39. For example, in the case where the video picture in the link A is frozen by the failure on the link A, a value of the unit 37 for calculation of the sum of absolute inter-frame differences on the link A becomes 0, but a value of the unit 38 for calculation of the sum of absolute inter-frame differences on the link B does not become 0. An output signal of B>A is obtained in the comparison unit 39, so that it is possible to detect that video freeze occurs on the link A. Thereafter, information indicating occurrence of a failure on the link A is output from the comparison unit 39. However, since in the case of a stationary picture, both of the value of the unit 37 and 38 for calculation of the sum of absolute inter-frame differences on the link A and B become 0, the signal 0 is output from the comparison unit 39, so that it is judged that the image is a stationary picture.

Figure 7:
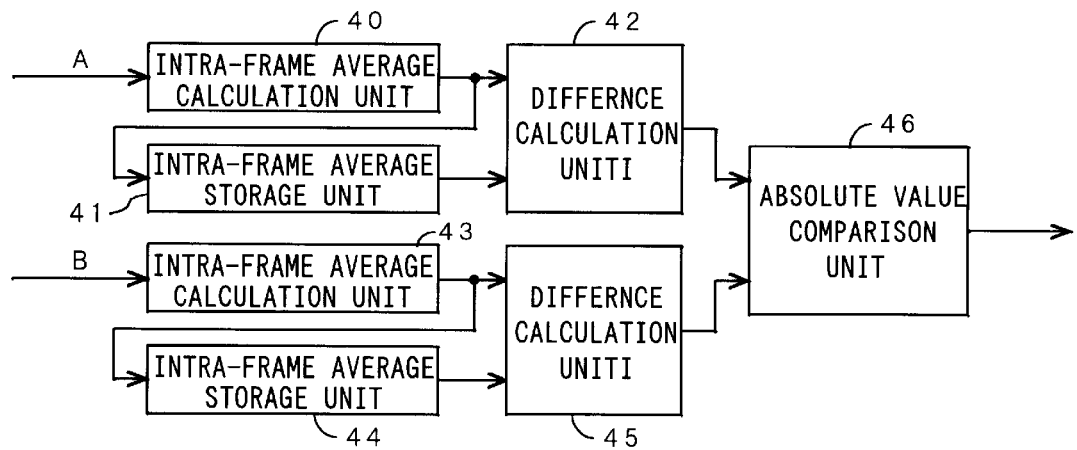
FIG. 7 is a block diagram illustrating one specific example of a video blackout detection unit.
Figure 8:
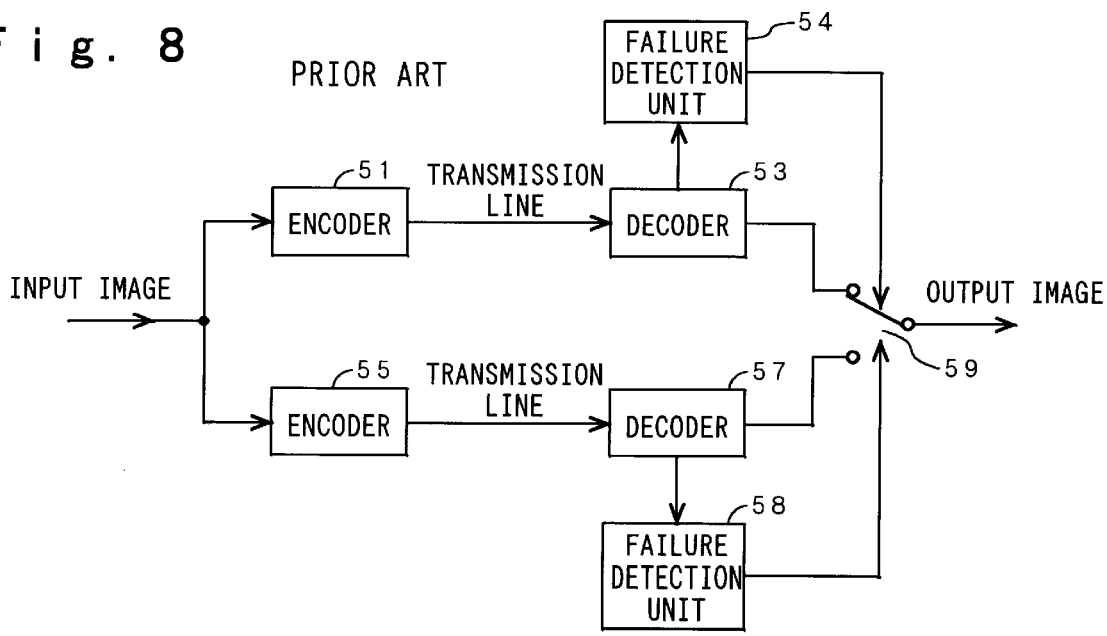
FIG. 8 is a block diagram illustrating one example of a failure detection unit in the prior art.

Next, description will be given of the configuration and function of the video blackout detection unit 22 in reference to FIG. 7. The video blackout detection unit 22 is a circuit for detecting an abrupt change of a video picture to a black or white level. Specifically, the video blackout detection unit 22 includes intra-frame average calculation units 40 and 43 for determining an intra-frame average of two continuous frames to the links A and B; intra-frame average storage units 41 and 44; difference calculation units 42 and 45 for calculating a difference between the intra-frame averages of a preceding frame and a current frame per link; and an absolute value comparison unit 46 for comparing absolute values of the difference calculation units 42 and 45. Since the entire video picture is abruptly changed to a black or white level if video blackout occurs in one of the links, as described above, the absolute value of the differences of the value obtained by the difference calculation units 42 and 45 becomes remarkably great. Consequently, if the absolute value comparison unit 46 judges that the absolute value of the differences of the value obtained by the difference calculation units 42 and 45 is remarkably great, for example, it exceeds a predetermined great threshold value, it is judged that a failure of video blackout occurs on the link having the great difference in the difference calculation unit 42 or 45, so that the absolute value comparison unit 46 outputs an output signal of the disrupted link.

In the above-described embodiment, when the counter 32 of the majority decision unit 20 sequentially counts 600 signals 0, the resetting signal is output to the shift register 31. That is, if it is judged that the transmitted state is normal over 600 fields, i.e., for 10 seconds, the resetting signal is output from the counter 32. In general, since the probability of occurrence of one or more failures on the transmission line per period as short as, e.g., 10 seconds is very low, the shift register 31 is generally reset when a failure occurs on the transmission line. Consequently, if a significant failure occurs on, for example, the link A as a regular link in the state in which both of the links A and B are normal, one signal A is loaded on the reset shift register 31. At this time, the count A of the counter A 33 becomes greater than the count B of the counter B 34, so that the signal B is output from the final judgment circuit 36. As a result, the switcher 6 is switched to the link B, and then, an image on the normal link B is output as an output image. Consequently, in the present embodiment, when the failure occurs on the regular link, the link is switched to a normal backup link after a lapse of one field. Therefore, the output image having the failure occurring in switching can be suppressed to only one field. If one-field delay units are interposed at the fore stage before the switcher 6, for example, between the decoders 3 and 5 and the switcher 6, outputting of an image having the failure occurring in switching of the switcher 6 can be suppressed to zero.

Moreover, in the present embodiment, no insignificant failure signal can be loaded on the shift register 31.

Furthermore, since the switching of the switcher 6 is controlled based on the majority decision of the signals A and B loaded on the shift register 31, it is possible to avoid an influence of an uncertain failure signal or failure signals alternately occurring on the links A and B for a short period of time on the switching of the switcher 6 as possible, thereby providing the image failure detection unit of high reliability.

Although in the above-described embodiment, the units 15 and 16 for the detection of the image feature difference determine the sum of the absolute differences of the portions along the boundary between the normal/corrupted regions with respect to each of the features, the present invention is not limited thereto. The respective features in the normal/corrupted regions may be averaged to take the difference therebetween. As to the link A, the difference is expressed by the equation (6) in FIG. 4, wherein O and X represent the normal region and the corrupted region, respectively; no and n, represent the numbers of blocks in the normal region and the corrupted region, respectively.

Additionally, although in the above-described embodiment, the encoders 1 and 4 and the decoders 3 and 5 for compressing and decompressing the image are disposed on the links A and B, respectively, the present invention is not limited thereto. The present invention can be applicable to a transmission line in which an image is transmitted in a non-compressed state.

As is clear from the above description, according to the present invention, the failure of the link is detected by using the image features of the image transmitted via the plurality of links, so that it is possible to detect at real time which link the failure occurs on. Therefore, if the failure occurs on the regular link, the link can be instantaneously switched to the backup link, thus completely preventing or remarkably reducing the outputting of the image having the failure.

Moreover, it is judged whether the failure is significant or insignificant. The majority decision is made only for the significant failure, so that it is judged which link the failure occurs on. Thus, it is possible to enhance the accuracy of the judgment of the link on which the failure occurs and stabilize the switching of the links.

Additionally, it is possible to detect the video freeze and the video blackout with high accuracy, thus detecting the failure on the link caused by the video freeze and the video blackout so as to switch the link to the normal link. Thus, it is possible to prevent or reduce the image having the failure such as the video freeze or the video blackout from being output.

What is claimed is:

1. An image failure detection unit in redundant duplex transmission, in which the same image is transmitted via a plurality of links and the image transmitted via a normal link is selectively used as an output image, said image failure detection unit comprising:

means for calculating image features per small region inside each of the images transmitted via the plurality of links; and means for comparing differences, between the links, in image feature per small region inside each of the images determined by the means for calculating image features;

wherein when there is no difference in image feature per small region between the links, it is judged that the link is normal; to the contrary, when there is a difference, it is judged that a failure occurs on either of the links.

2. An image failure detection unit in redundant duplex transmission as claimed in claim 1, wherein the image features signify one or more kinds of image features.

3. An image failure detection unit in redundant duplex transmission as claimed in claim 2, further comprising:

means for storing the small region as a normal region in the case where there is no difference, between the links, in image feature per small region inside each of the images, while for storing the small region as a corrupted region in the case where there is a difference; and means for determining a difference in image feature between the normal region and the corrupted region for each link;

wherein it is judged that a failure occurs on the link having a greater difference.

4. An image failure detection unit in redundant duplex transmission as claimed in claim 3, wherein the difference in image feature between the normal region and the corrupted region is determined based on the image features in the small regions of the normal and corrupted regions in contact with the boundary between the normal region and the corrupted region.

5. An image failure detection unit in redundant duplex transmission as claimed in claim 1, further comprising:

means for storing the small region as a normal region in the case where there is no difference, between the links, in image feature per small region inside each of the images, while for storing the small region as a corrupted region in the case where there is a difference; and means for determining a difference in image feature between the normal region and the corrupted region for each link;

wherein it is judged that a failure occurs on the link having a greater difference.

6. An image failure detection unit in redundant duplex transmission as claimed in claim 5, wherein the difference in image feature between the normal region and the corrupted region is determined based on the image features in the small regions of the normal and corrupted regions in contact with the boundary between the normal region and the corrupted region.

7. An image failure detection unit in redundant duplex transmission as claimed in claim 6, further comprising:

significant/insignificant judgment means for judging whether or not the difference in image feature between the normal region and the corrupted region is a predetermined value or greater, so as to regard the failure to be significant if the difference is the predetermined value or greater; to the contrary, so as to regard the failure to be insignificant if the difference is smaller than the predetermined value; and majority decision means for deciding the disrupted link based on the majority decision of the failure judged to be significant.

8. An image failure detection unit in redundant duplex transmission as claimed in claim 5, further comprising:

significant/insignificant judgment means for judging whether or not the difference in image feature between the normal region and the corrupted region is a predetermined value or greater, so as to regard the failure to be significant if the difference is the predetermined value or greater; to the contrary, so as to regard the failure to be insignificant if the difference is smaller than the predetermined value; and majority decision means for deciding the disrupted link based on the majority decision of the failure judged to be significant.

9. An image failure detection unit in redundant duplex transmission, in which the same image is transmitted via a plurality of links and the image transmitted via a normal link is selectively used as an output image, said image failure detection unit comprising:

means for determining a sum of absolute inter-frame differences of the image transmitted via the plurality of links so as to judge that the transmitted image is a stationary picture when the sum of the absolute inter-frame differences per link is 0 for both of the links, and further, so as to judge that a freeze failure occurs on one of the links if the sum of absolute inter-frame differences on one link is 0 while the sum of absolute inter-frame differences on the other link is not 0 and the transmitted image is not a stationary picture.

10. An image failure detection unit in redundant duplex transmission as claimed in claim 9, comprising significant/insignificant judgment means for judging that the failure is a significant failure if the freeze failure occurs; and majority decision means for deciding a disrupted link based on a majority decision of failures including the freeze failure.

11. An image failure detection unit in redundant duplex transmission, in which the same image is transmitted via a plurality of links and the image transmitted via a normal link is selectively used as an output image, said image failure detection unit comprising:

means for comparing intra-frame averages of a preceding frame and a current frame of an image transmitted via the plurality of links, so as to judge that a video blackout failure occurs on the link having the greater comparison result when the comparison result of one link has a difference more than a predetermined value from that of the other link.

12. An image failure detection unit in redundant duplex transmission as claimed in claim 11, comprising significant/insignificant judgment means for judging that the failure is a significant failure if the video blackout failure occurs; and majority decision means for deciding a disrupted link based on a majority decision of failures including the video blackout failure.

* * * * *